(12) United States Patent
Toelge

(10) Patent No.: US 12,325,391 B2
(45) Date of Patent: Jun. 10, 2025

(54) DEVICE AND METHOD FOR CONTROLLING A BRAKING SYSTEM, BRAKING SYSTEM AND VEHICLE

(71) Applicant: Bayerische Motoren Werke Aktiengesellschaft, Munich (DE)

(72) Inventor: Thomas Toelge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 438 days.

(21) Appl. No.: 17/928,001

(22) PCT Filed: May 21, 2021

(86) PCT No.: PCT/EP2021/063660
§ 371 (c)(1),
(2) Date: Nov. 28, 2022

(87) PCT Pub. No.: WO2021/239619
PCT Pub. Date: Dec. 2, 2021

(65) Prior Publication Data
US 2023/0211764 A1 Jul. 6, 2023

(30) Foreign Application Priority Data
May 29, 2020 (DE) ..................... 10 2020 114 568.3

(51) Int. Cl.
*B60T 13/66* (2006.01)
*B60T 7/04* (2006.01)
*B60T 8/172* (2006.01)

(52) U.S. Cl.
CPC ............ *B60T 13/662* (2013.01); *B60T 8/172* (2013.01); *B60T 7/042* (2013.01); *B60T 2201/03* (2013.01);
(Continued)

(58) Field of Classification Search
CPC .... B60T 13/662; B60T 8/172; B60T 2220/04; B60T 2201/03; B60T 2270/088; B60T 7/042; B60T 2270/82
See application file for complete search history.

(56) References Cited

U.S. PATENT DOCUMENTS 5,727,852 A   3/1998  Pueschel et al.
9,656,653 B2  5/2017  Svensson et al.
(Continued)

FOREIGN PATENT DOCUMENTS

| DE | 195 01 760 A1 | 7/1996 |
| DE | 10 2018 213 935 A1 | 2/2020 |
| WO | WO 2019/088296 A1 | 5/2019 |

OTHER PUBLICATIONS

British Patent No. GB 2289098 to Resch published on Nov. 8, 1995.*
(Continued)

*Primary Examiner* — Pamela Rodriguez
(74) *Attorney, Agent, or Firm* — Crowell & Moring LLP

(57) ABSTRACT

A device for controlling a braking system of a vehicle may include a position sensor device which is designed to detect a position of a brake pedal and/or a piston of a main brake cylinder actuated by the brake pedal at multiple times, a pressure sensor device which is designed to detect a pressure in a fluid located in the cylinder at multiple times, and a control device which is designed to shift a braking assistance device into an activated state. The control device may make the shift when a temporal change of the detected position exceeds a predefined position gradient threshold value and/or if the distance between two detected positions exceeds a predefined position threshold value, wherein the position gradient threshold value or the position threshold value is provided according to a change in the detected pressure.

20 Claims, 6 Drawing Sheets

(52) U.S. Cl.
CPC ....... *B60T 2220/04* (2013.01); *B60T 2270/82* (2013.01); *B60T 2270/88* (2013.01)

(56) References Cited

U.S. PATENT DOCUMENTS

| | | | |
|---|---|---|---|
| 10,239,510 B2 * | 3/2019 | Svensson | B60T 7/042 |
| 2008/0143177 A1 | 6/2008 | Bernzen et al. | |
| 2013/0204491 A1 * | 8/2013 | Matsubayashi | B60T 17/22 |
| | | | 701/70 |
| 2017/0297545 A1 * | 10/2017 | Kim | B60T 8/172 |
| 2020/0001846 A1 | 1/2020 | Kohl et al. | |
| 2020/0290576 A1 | 9/2020 | Kobayashi et al. | |

OTHER PUBLICATIONS

International Search Report (PCT/ISA/210) issued in PCT Application No. PCT/EP2021/063660 dated Sep. 21, 2021 with English translation (four (4) pages).

German-language Written Opinion (PCT/ISA/237) issued in PCT Application No. PCT/EP2021/063660 dated Sep. 21, 2021 (eight (8) pages).

German-language Search Report issued in German Application No. 10 2020 114 568.3 dated Feb. 18, 2021 with partial English translation (10 pages).

* cited by examiner

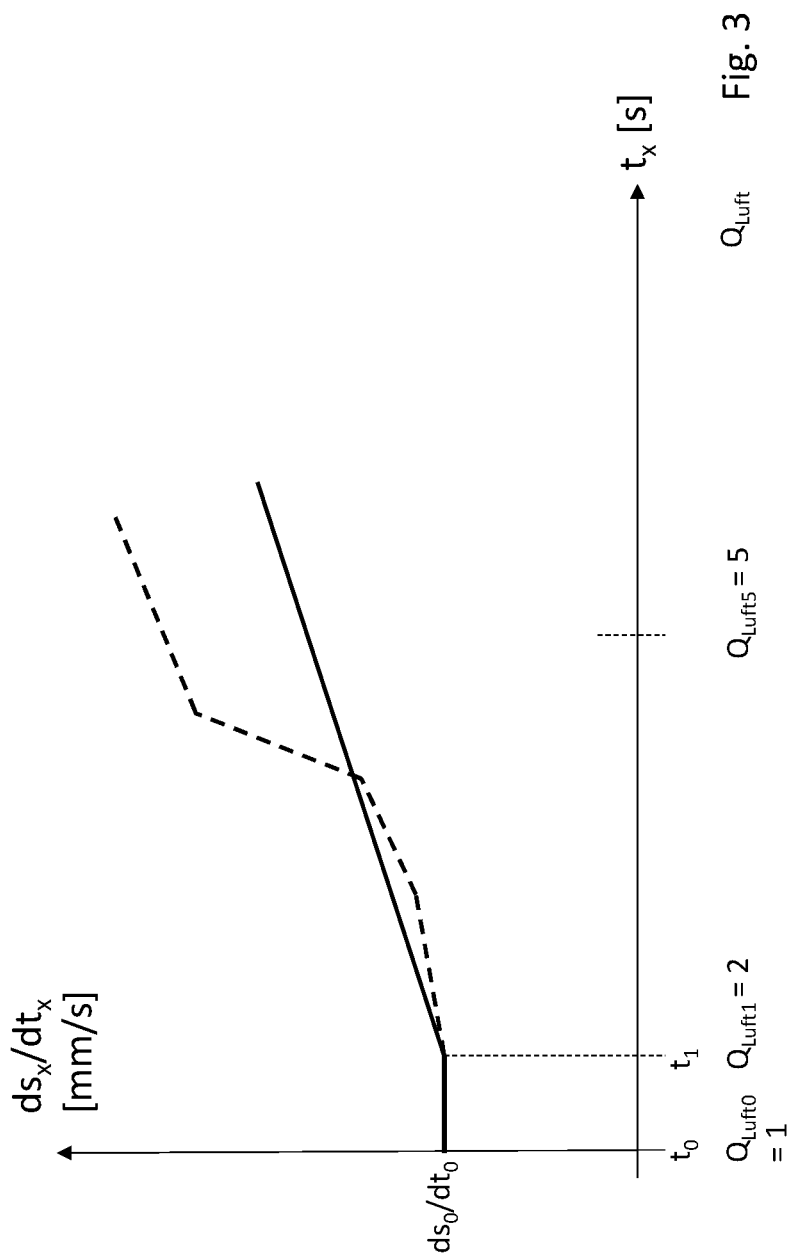

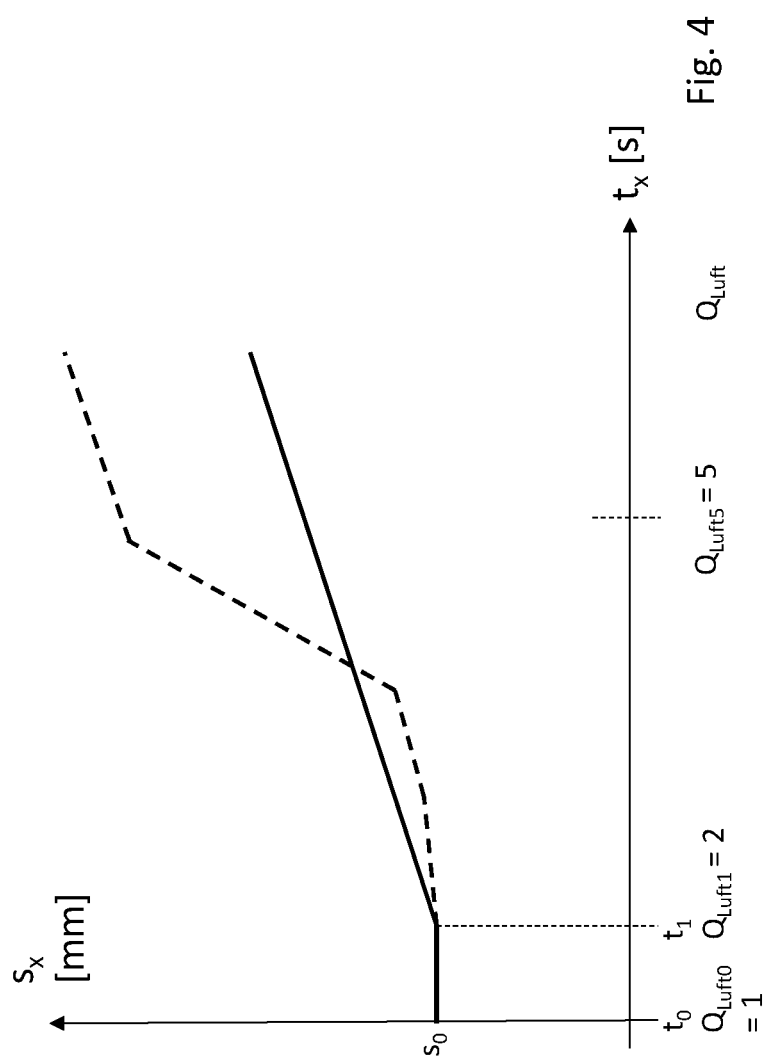

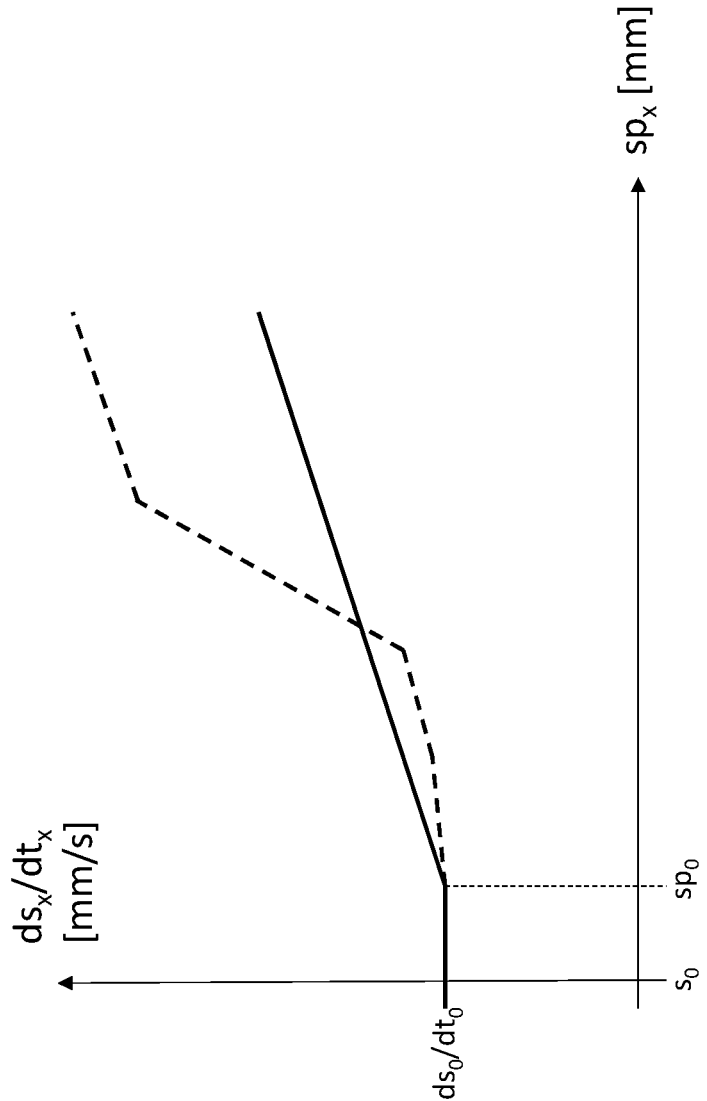

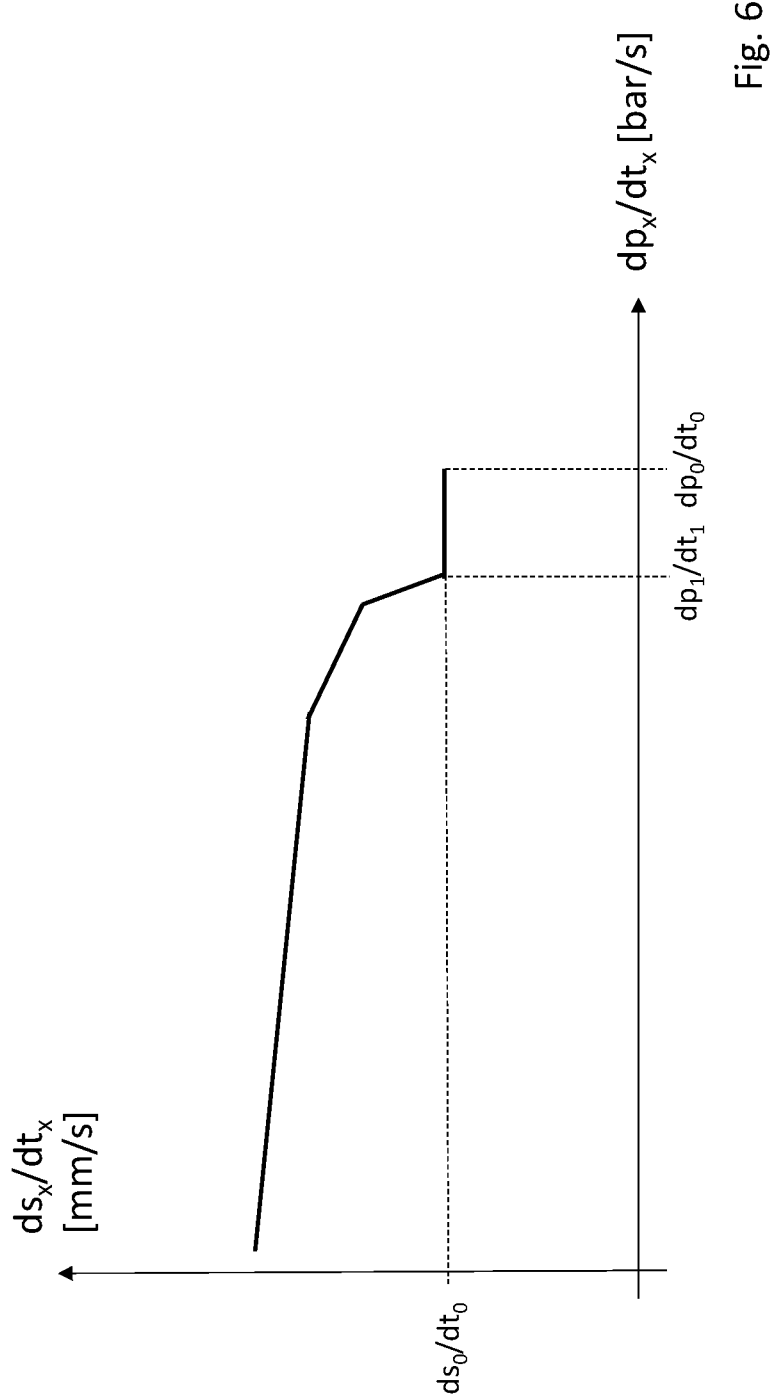

DEVICE AND METHOD FOR CONTROLLING A BRAKING SYSTEM, BRAKING SYSTEM AND VEHICLE

BACKGROUND AND SUMMARY

The invention relates to a device and to a method for controlling a braking system of a vehicle, in particular motor vehicle, to a braking system, and to a vehicle.

So-called brake assistants, which in the event of braking for reasons of an emergency or hazard intended or initiated by a driver ensure an amplification of the braking force up to a maximum braking force required for a full stop are used in many motor vehicles. The detection and evaluation of the manner in which the driver activates the brake pedal is used in particular as the basis for such a variation of the braking force amplification characteristic curve, or for activating the brake assistant. In this way, it can be provided that the brake assistant is activated as soon as a predefined value for the pedal activation speed and a minimum pressure in the master brake cylinder are exceeded.

In so-called brake-by-wire braking systems, in which the brake pedal and the wheel brakes are decoupled from one another, the braking characteristic is based on an interaction between a tandem master brake cylinder and a pedal force simulator hydraulically connected thereto. A pedal force/pedal path characteristic curve, which the driver can sense when activating the brake pedal, is derived from this interaction. During emergency braking, a corresponding counterforce acts counter to the pedal activation and permits a specific pedal activation speed. The latter is determined with the pedal path detected with the aid of a path sensor and is compared with a predefined trigger threshold. If the latter is exceeded, the brake assistant is thus triggered or activated.

As a result of residual air in the simulator circuit, i.e. in the tandem master brake cylinder, in the pedal force simulator and/or in the hydraulic connection therebetween, which can arise repeatedly by virtue of a variance in the quality of ventilation, the pedal force/pedal path characteristic curve may be displaced such that the counterforce on the brake pedal is deficient in the presence of residual air at the start of the braking action. In this way, the brake pedal increasingly yields or fades when activated, so that the pedal activation speed is higher than in the absence of residual air, in particular when the brake is more rapidly activated. This can result in premature, unintentional triggering of the brake assistant.

It is an object of the invention to specify a device and a method for controlling a braking system of a vehicle, a braking system, and a vehicle, which make possible a more reliable activation of the brake assistant.

This object is achieved, for example, by a device and a method for controlling a braking system of a vehicle, according to the independent claims, and by a braking system having such a device, and by a vehicle having such a braking system.

A first aspect of the invention includes a device for controlling a braking system which has: a master brake cylinder installation, in particular a tandem master brake cylinder, having at least one cylinder and at least one piston which is movably mounted in the cylinder and, when activated by a brake pedal, is specified for pressurizing fluid situated in the cylinder; one or a plurality of braking installations which are specified for impinging one or a plurality of wheels of the vehicle with a braking force; and a brake assistant installation which can be set to an activated state and a deactivated state and, in the activated state, is specified for increasing the braking force by way of which the wheels of the vehicle are impinged by the braking installations in comparison to the deactivated state. The device here has: a path sensor installation which is specified for detecting a position of the brake pedal and/or of the piston activated by the brake pedal at a plurality of points in time; a pressure sensor installation which is specified for detecting a pressure in the fluid situated in the cylinder at a plurality of points in time; and a control installation which is specified for setting the brake assist installation to the activated state when a temporal variation of the detected position exceeds a predefined path gradient threshold value and optionally the spacing between two detected positions exceeds a predefined path threshold value, wherein the path gradient threshold value, or the path threshold value, is predefined as a function of a variation of the detected pressure.

According to a second aspect of the invention, a braking system for a vehicle, in particular motor vehicle, has: a master brake cylinder installation, in particular a tandem master brake cylinder, having at least one cylinder and at least one piston which is movably mounted in the cylinder and, when activated by a brake pedal, is specified for pressurizing a fluid situated in the cylinder; one or a plurality of braking installations which are specified for impinging one or a plurality of wheels of the vehicle with a braking force; a brake assistant installation which can be set to an activated state and the deactivated state and, in the activated state, is specified for increasing the braking force by way of which the wheels of the vehicle are impinged by the braking installations in comparison to the deactivated state; and a device according to the first aspect.

According to a third aspect of the invention, a vehicle, in particular a motor vehicle, has a plurality of wheels and a braking system according to the second aspect.

Specified according to a fourth aspect of the invention is a method for controlling a braking system of a vehicle, in particular motor vehicle, wherein the braking system has: a master brake cylinder installation, in particular a tandem master brake cylinder, having at least one cylinder and at least one piston which is movably mounted in the cylinder and, when activated by a brake pedal, is specified for pressurizing a fluid situated in the cylinder; one or a plurality of braking installations which are specified for impinging one or a plurality of wheels of the vehicle with a braking force; and a brake assistant installation which can be set to an activated state and a deactivated state and, in the activated state, is specified for increasing the braking force by way of which the wheels of the vehicle are impinged by the braking installations in comparison to the deactivated state. The method comprises the following steps: detecting a position of the brake pedal and/or of the piston activated by the brake pedal at a plurality of points in time; detecting a pressure in the fluid situated in the cylinder at a plurality of points in time; and activating the brake assistant installation when a temporal variation of the detected position exceeds a predefined path gradient threshold value and optionally the spacing between two detected positions exceeds a predefined path threshold value, wherein the path gradient threshold value, or the path threshold value, is predefined as a function of a variation of the detected pressure.

Unless otherwise stated, the terms "position" and "path" with reference to the brake pedal are used synonymously in the context of the present disclosure. Accordingly, the terms "positional variation" and "path gradient" are also used synonymously.

Aspects of the invention are preferably based on the approach of activating the brake assistant installation only when the path of the brake pedal, or of the piston coupled to the brake pedal, travelled in the event of an activation of the brake pedal exceeds a path gradient threshold value which is determined or predefined as a function of the detected temporal behavior of the pressure in the fluid. It can optionally be provided that the brake assistant installation is activated only when the path of the brake pedal, or of the piston coupled to the brake pedal, travelled in the event of an activation of the brake pedal, in addition to the path gradient threshold value, exceeds a path threshold value which is likewise determined or predefined as a function of the detected temporal behavior of the pressure in the fluid. The path gradient threshold value here represents a minimum speed at which the brake pedal, or the piston, has to be activated in order for the brake assistant to be activated. Accordingly, the optional path threshold value represents a minimum path which the brake pedal or the piston must travel so that the brake assistant is activated. The minimum speed required for an activation of the brake assistant, or the required minimum path of the brake pedal or of the piston, here is a function of the temporal behavior of the detected pressure. This means that the detected pressure, or the temporal behavior of the pressure, is used for determining the path gradient threshold value or the path threshold value, the detected positional variation of the brake pedal or of the piston being checked with the path gradient threshold value or the path threshold value. The detected pressure per se, or the temporal behavior of the pressure per se, here does not represent a (primary) check criterion when triggering the brake assistant. However, it can be provided that the activation of the brake assistant is made dependent on the fact that, when activating the brake pedal or the piston, the path gradient threshold value, or path threshold value, predefined as a function of the detected pressure behavior is exceeded and, additionally, the detected pressure per se, or the temporal behavior of the pressure per se, meets specific predefined criteria, for example that a predefined pressure threshold and/or a predefined pressure gradient threshold is exceeded.

As a result of the invention, influences of residual air in the braking system, for instance in the simulator circuit of a brake-by-wire system, the latter also being referred to as a pedal-decoupled brake system, can in particular be reduced or even eliminated. Potential residual air when activating the brake pedal thus typically leads to a significantly increased path gradient (pedal speed) as would be the case in the absence of residual air, because the pressure and thus the counterforce increases only once the air has been sufficiently compressed, this potentially resulting in an unintentional activation of the brake assistant. The occurrence of such situations can be prevented or at least minimized by a selection or specification of the path gradient threshold value and/or path threshold value according to the invention, i.e. as a function of the dynamics of the detected pressure. As a result, braking for the reason of a hazard or emergency, as potentially intended by the driver of the vehicle, is significantly more reliably identified and accordingly supported by the activation of the brake assistant.

Overall, the invention in this way makes it possible for the brake assistant to be more reliably activated.

A brake assistant installation is preferably a brake booster installation, or a component part or at least a functionality of a brake booster installation, which in the event of braking for the reason of an emergency or hazard intended or initiated by the driver, can cause an amplification of the braking force up to a maximum braking force required for a full stop. In a vehicle equipped with a brake booster installation, the braking force is preferably also amplified to a certain extent in the normal operation, i.e. without an activation of the brake assistant installation in the event of braking for the reason of an emergency or hazard.

The variation of the detected pressure, of which the predefined path gradient threshold value or path threshold value is a function, is preferably defined by a temporal offset between the start of a variation of the detected position and the start of a variation, in particular an increase, of the detected pressure. The temporal offset thus characterizes the temporal delay between the start of the activation of the brake pedal and the start of a pressure variation, in particular pressure increase, in the master brake cylinder. It can be concluded from this temporal delay whether or to what extent variances in the braking system that are caused by residual air in the simulator circuit for instance, are present, and the path gradient threshold value and/or path threshold value can be correspondingly adapted as a function thereof. The path gradient threshold value and/or path threshold value here preferably increases along with the temporal offset, in particular when the temporal offset exceeds a predefined temporal offset. The path gradient threshold value or path threshold value preferably increases proportionally with the temporal offset, or else may increase and/or decrease along with the temporal offset in another way.

Alternatively or additionally, the variation of the detected pressure, of which the predefined path gradient threshold value or path threshold value is a function, is defined by a spatial offset between the position detected at the start of a variation and the position detected at the start of a variation, in particular an increase, of the detected pressure. In a manner analogous to the temporal offset described above, the spatial offset characterizes the path travelled by the brake pedal between the start of the activation of the pedal and the start of a pressure variation, in particular pressure increase, in the master brake cylinder. It can be concluded from this path whether or to what extent variances in the braking system that are caused by residual air in the simulator circuit for instance, are present, and the path gradient threshold value and/or path threshold value can be correspondingly adapted as a function thereof. The path gradient threshold value and/or path threshold value preferably increases along with the spatial offset, in particular when the spatial offset exceeds a predefined spatial offset. The path gradient threshold value or path threshold value preferably increases proportionally with the spatial offset, or else may increase and/or decrease along with the spatial offset in another way.

Alternatively or additionally, the variation of the detected pressure, of which the predefined path gradient threshold value or path threshold value is a function, is defined by a gradient of the detected pressure. The gradient of the detected pressure, which can also be referred to as the pressure gradient, the pressure variation rate or a pressure variation speed, thus characterizes the extent of the pressure increase in the fluid of the master brake cylinder as a response to an activation of the brake pedal. It can be concluded from this pressure increase whether or to what extent variances in the braking system that are caused by residual air in the simulator circuit for instance, are present, and the path gradient threshold value and/or path threshold value can be correspondingly adapted as a function thereof. The path gradient threshold value and/or path threshold value here preferably increases along with a decreasing gradient of the detected pressure, or decreases along with an increasing gradient of the detected pressure, in particular when the gradient of the detected pressure undershoots a predefined value. The path gradient threshold value or path threshold value can have a profile which in one or a plurality of portions preferably runs proportionally with the gradient of the detected pressure, or else may increase and/or decrease along with the gradient of the detected pressure in another way.

BRIEF DESCRIPTION OF THE DRAWINGS

Further preferred or alternative aspects, exemplary embodiments and advantages of the invention will be explained hereunder with reference to figures in which:

FIG. 3 shows an example for the path gradient threshold value as a function of the temporal offset between the start of a variation of the detected position and the start of an increase of the detected pressure;

FIG. 4 shows an example of the path threshold value as a function of the temporal offset between the start of a variation of the detected position and the start of an increase of the detected pressure;

FIG. 5 shows an example of the path gradient threshold value as a function of the spatial offset between the position detected at the start of a variation and the position detected at the start of an increase of the detected pressure; and FIG. 6 shows an example of the path gradient threshold value as a function of the pressure gradient.

DETAILED DESCRIPTION OF THE DRAWINGS

Figure 1:
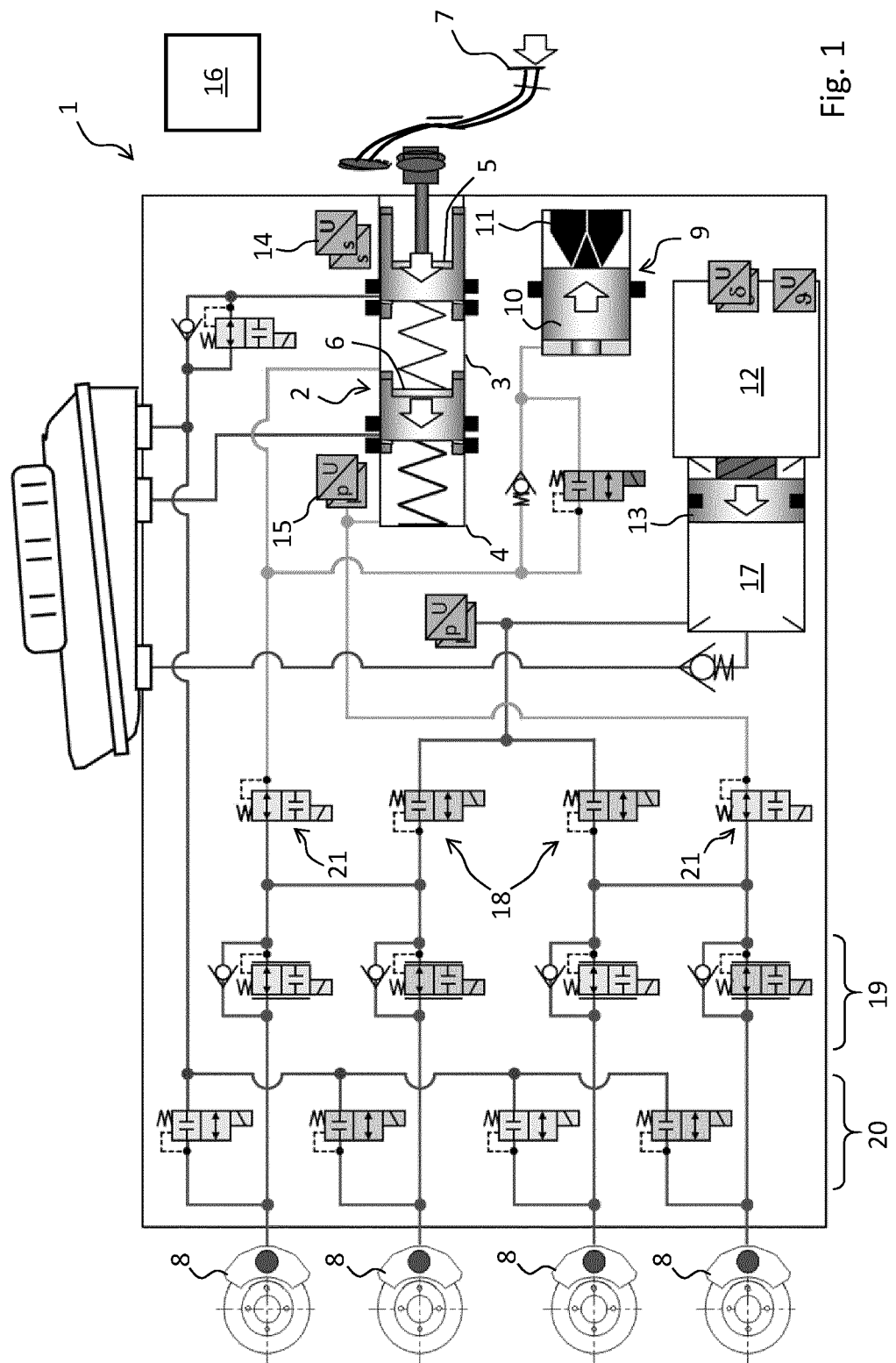
FIG. 1 shows an example of a braking system.

FIG. 1 shows an example of a braking system 1 having a master brake cylinder installation which presently is configured as the tandem master brake cylinder 2, which hereunder is also referred to by "THz" for short and has a first and a second cylinder portion 3 and 4, respectively, and a first and a second piston 5 and 6, respectively, the pistons 5 and 6 being movably mounted in the respective cylinder portion 3 or 4, respectively, and when activated by a brake pedal 7 which is presently only schematically reproduced, are specified/configured for pressurizing a fluid situated in the THz 2 (see the respective arrows pointing toward the left).

The example illustrated is a so-called pedal-decoupled braking system 1 which is also referred to as a brake-by-wire system, in which the brake pedal 7 and the wheel brakes 8 are decoupled from one another. The braking characteristic which is sensed by the driver when activating the brake pedal 7 here is based on an interaction between the THz 2 and a pedal force simulator 9 which is hydraulically connected to the latter and has a piston 10 which, as a function of the pressure in the THz 2, compresses an elastic element 11 (see the arrow on the piston 10 that points toward the right).

Furthermore provided is a brake assistant installation which can be set to an activated state and a deactivated state, wherein, in the activated state, the braking force by way of which the wheels of the vehicle are impinged by the wheel brakes 8, is increased in comparison to the deactivated state. The brake assistant installation can be configured as part of, or a sub-function of, a brake booster installation which to a certain extent causes an amplification of the brake force on the wheels also in the case of a deactivated brake assistant installation.

Provided for the corresponding braking force amplification in the present example is a linear actuator 12 which by displacing a piston 13 impinges a brake fluid 17 with an additional pressure (see the arrow on the piston 13 that points toward the left), this additional pressure by way of plunger sequence valves 18 and inlet valves 19 being relayed to the wheel brakes 8. The wheel brakes 8 are in each case furthermore assigned outlet valves 20. The fluid situated in the first and the second cylinder portion 3 and 4 of the THz 2, respectively, is hydraulically coupled to the wheel brakes 8 and decoupled from the latter by driver isolation valves 21.

Moreover provided is a control installation 16 which, for the purpose of boosting the brake force in the event of braking for the reason of an emergency or hazard, can activate or deactivate the brake assistant installation in that the respective components, in particular the linear actuator 12 and/or the plunger sequence valves 18 and/or the driver isolation valves 21, are correspondingly controlled.

Furthermore provided is a path sensor 14 which, in particular continuously, detects the current position and/or the path of the brake pedal 7 and/or of the first piston 5 moved by the brake pedal 7, travelled from the start of the activation, at a plurality of points in time.

A pressure in the THz 2, in particular in the fluid situated in the second cylinder portion 4, is, in particular continuously, detected at a plurality of points in time by a pressure sensor 15.

The control installation 16 is specified/configured for setting the brake assistant installation to the activated state when a temporal variation of the detected position, or of the path ds/dt of the brake pedal 7, or of the piston 5, respectively, travelled from the start of the activation exceeds a predefined path gradient threshold value $ds_x/dt_x$, and optionally the spacing s between two detected positions, in particular the path s of the brake pedal 7, or of the piston 5, travelled from the start of the activation, additionally exceeds a predefined path threshold value $s_x$. The predefined path gradient threshold value $ds_x/dt_x$, or path threshold value $s_x$, utilized in this check here is a function of a variation of the detected pressure, this being explained in more detail hereunder with reference to FIGS. 2 to 6.

Figure 2:
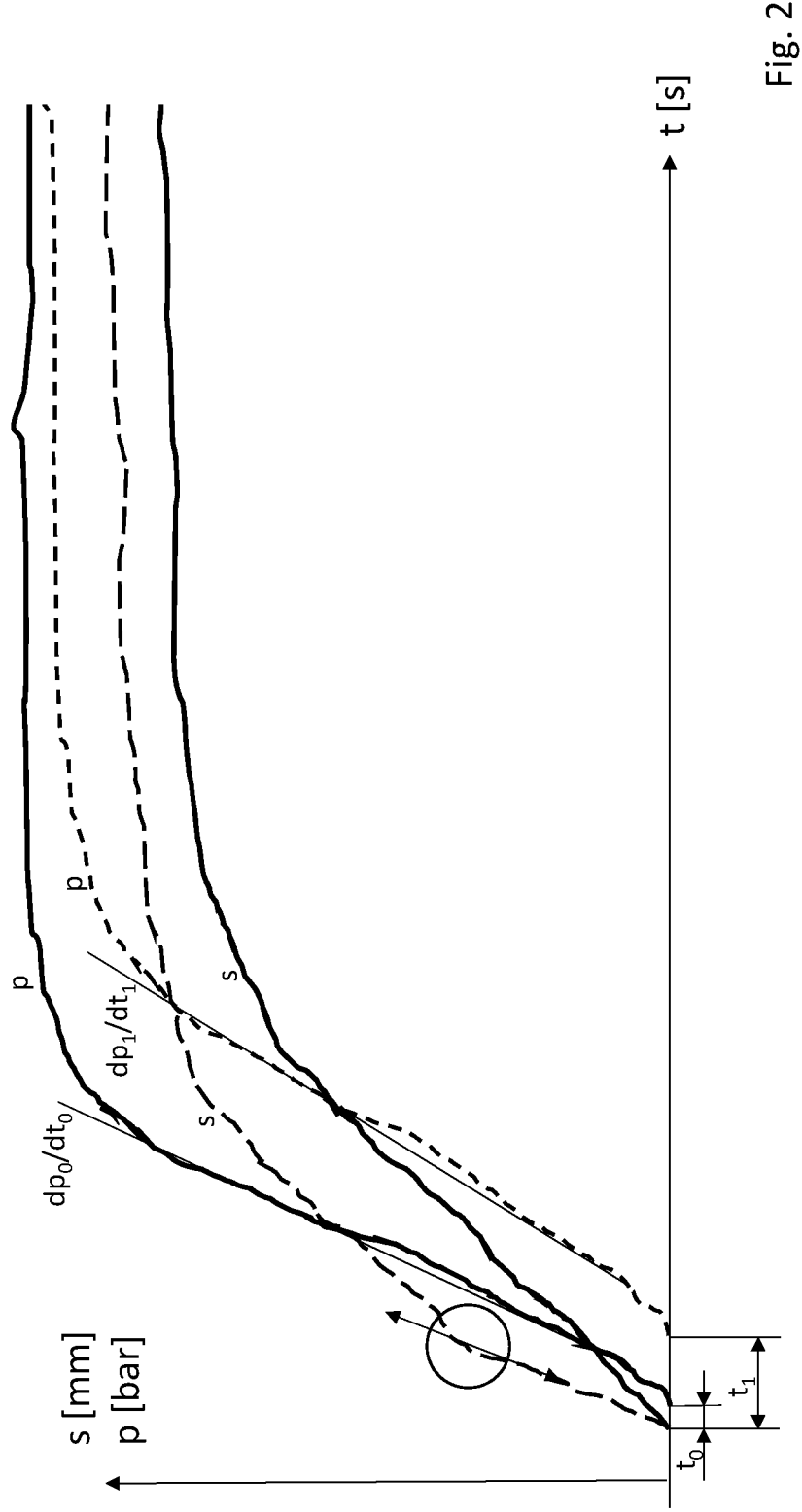
FIG. 2 shows in each case an example for the temporal profile of the path travelled by the brake pedal and of the pressure in the master brake cylinder for a braking system without residual air (solid lines) and with residual air (dashed lines)

FIG. 2 shows in each case an example for a temporal profile of the path s travelled by the brake pedal 7 and of the pressure p in the THz 2 detected by the path sensor 14 or pressure sensor 15, respectively, for a braking system 1 without residual air (solid lines) and with residual air (dashed lines) in the simulator circuit, i.e. in the THZ 2 and/or pedal force simulator 10 and/or in the hydraulic connection therebetween. The path profiles or pressure profiles illustrated in the example typically arise in a rapid activation of the brake pedal 7, for instance in the event of braking for the reason of a hazard or emergency intended by a driver.

If there is no residual air or only very little residual air in the simulator circuit, the activation of the brake pedal 7 after a certain time delay to leads to a relatively steep increase of the pressure p (solid line) in the THz 2 and thus to a relatively great pressure gradient $dp_0/dt_0$ which counteracts the pedal movement such that the path s (solid line) travelled by the brake pedal 7 does not increase too rapidly. In contrast, if there is residual air in the simulator circuit, a relatively steep increase of the travelled path s (dashed line) arises when the brake pedal 7 is activated, because the pressure p (dashed line) in the THz 2 increases only after a comparatively large temporal delay $t_1$ and also displays a less steep gradient, i.e. a smaller pressure gradient $dp_1/dt_1$, such that the force counteracting the pedal movement arises correspondingly later and increases at a slower pace.

In order to eliminate or at least reduce influences of residual air in the simulator circuit on the activation of the brake assistant, the path gradient threshold value and/or path threshold value that is to be reached or to be exceeded by the detected path of the brake pedal 7 in order to trigger an activation of the brake assistant is determined and/or predefined or influenced as a function of the detected behavior of the pressure p.

The path gradient threshold value and/or path threshold value here is preferably predefined as a function of the temporal offset between the start of a variation of the detected position s of the brake pedal 7 and the start of an increase of the detected pressure p. Alternatively or additionally, the path gradient threshold value and/or path threshold value can also be predefined as a function of a spatial offset between the position of the brake pedal 7 detected at the start of a variation and the position detected at the start of an increase of the detected pressure p. Alternatively or additionally, the path gradient threshold value and/or the path threshold value can also be predefined as a function of a gradient of the pressure. This will be explained in more detail hereunder with reference to FIGS. 3 to 6.

FIG. 3 shows an example of the predefined path gradient threshold value $ds_x/dtx$ as a function of the temporal offset $t_x$ between the start of a variation of the detected position s and the start of an increase of the detected pressure p. The path gradient threshold value $ds_x/dt_x$ in the exemplary profile shown equals $ds_0/dt_0$ (see FIG. 2) when the temporal offset $t_x$ is less than $t_1$. If the temporal offset $t_x$ is greater than $t_1$, the path gradient threshold value $ds_x/dt_x$ increases in a linear manner (solid line) along with the temporal offset $t_x$. Alternatively, the increase of the path gradient threshold value $ds_x/dt_x$ may also have another profile (dashed line). In general, the temporal dependence of the path gradient threshold value $ds_x/dt_x$ may also be more complex, as will be explained in more detail hereunder in an exemplary manner.

The temporal offset can preferably be continuously determined in each activation of the brake as a function of the activation speed and leads to a quality value $Q_{Luft}$ which describes the ventilation state of the simulator brake circuit. For example, $Q_{Luft}=1$ corresponds to the normal state without residual air, and $Q_{Luft}=10$ means a lot of residual air. For each brake activation speed the pressure increase is expected after a specific time: in a slow activation after a comparatively large temporal delay, in a faster activation correspondingly at a shorter temporal delay. Accordingly, the quality value $Q_{Luft}$ is preferably derived from the temporal delays at different activation speeds.

FIG. 4 shows an example of the predefined path threshold value $s_x$ as a function of the temporal offset $t_x$ between the start of a variation of the detected position s and the start of an increase of the detected pressure p. In a manner analogous to the example shown in FIG. 3, the path threshold value $s_x$ in the exemplary profile shown equals $s_0$ when the temporal offset $t_x$ is less than $t_1$ (see FIG. 2). If the temporal offset $t_x$ is greater than $t_1$, the path threshold value $s_x$ increases in a linear manner (solid line) along with the temporal offset $t_x$. Alternatively, the increase of the path threshold value $s_x$ may also have another profile (dashed line). In general, the temporal dependence of the path threshold value $s_x$ may also be more complex, as will be explained in more detail hereunder in an exemplary manner.

The temporal offset can preferably be determined continuously in each activation of the brake as a function of the activation speed and leads to a quality value $Q_{Luft}$ which describes the ventilation state of the simulator brake circuit. For example, $Q_{Luft}=1$ corresponds to the normal state without residual air, and $Q_{Luft}=10$ means a lot of residual air. For each brake activation speed the pressure increase is expected after a specific time: in a slow activation after a comparatively large temporal delay, in a faster activation correspondingly at a shorter temporal delay. Accordingly, the quality value $Q_{Luft}$ is preferably derived from the temporal delays at different activation speeds.

FIG. 5 shows an example of the predefined path gradient threshold value $ds_x/dt_x$ as a function of the spatial offset $sp_x$ between the position s of the brake pedal 7 detected at the start of a variation and the position s of the brake pedal 7 detected at the start of an increase of the detected pressure p. The path gradient threshold value $ds_x/dt_x$ in the exemplary profile shown equals $ds_0/dt_0$ (see FIG. 2) when the spatial offset $sp_x$ is less than $sp_0$. If the spatial offset $sp_x$ is greater than $sp_0$, the path gradient threshold value $ds_x/dt_x$ increases in a linear manner (solid line) along with the spatial offset $sp_x$. Alternatively, the increase of the path gradient threshold value $ds_x/dt_x$ may however also have another profile (dashed line).

The spatial offset can preferably be continuously determined in each activation of the brake.

FIG. 6 shows an example of the predefined path gradient threshold value $ds_x/dt_x$ as a function of the gradient $dp_x/dt_x$ of the detected pressure p. The path gradient threshold value $ds_x/dt_x$ in the exemplary profile shown equals $ds_0/dt_0$ (see FIG. 2) when the pressure gradient $dp_x/dt_x$ is greater than $dp_1/dt_1$. If the pressure gradient $dp_x/dt_x$ is less than $dp_1/dt_1$, the path gradient threshold value $ds_x/dt_x$ (solid line) increases as the pressure gradient $dp_x/dt_x$ decreases, or decreases as the pressure gradient $dp_x/dt_x$ increases, respectively.

In principle, the threshold values mentioned in the context of the present disclosure, i.e. the path gradient threshold values $ds_x/dt_x$ or path threshold values $ds_x$, and/or the variation thereof can be specified/configured or predefined in absolute terms or else in relative terms, or as a factor. In this way, a factor of 100% or 1, for instance, can mean that there is no influence present as a result of residual air, and an adaptation or increase of the respective threshold value accordingly does not take place, while a factor of 110% or 1.1 means that the respective threshold value is increased by 10%.

An analogous course of action can be selected, for example, when the driver is on the brake pedal and rapidly depresses the latter again. Threshold values that have already been adapted to this situation are preferably influenced in a similar manner. However, residual air in the simulator circuit is not as relevant here because the driver, depending on the force of the activation, will have already largely compressed any potential air bubble.

LIST OF REFERENCE SIGNS

1 Braking system
2 Master brake cylinder, tandem master brake cylinder (THz)
3 First cylinder portion
4 Second cylinder portion
5 First piston
6 Second piston
7 Brake pedal 8 Braking installations, wheel brakes
9 Pedal force simulator
10 Piston
11 Elastic element
12 Linear actuator
13 Piston (on the linear actuator)
14 Path sensor
15 Pressure sensor
16 Control installation
17 Brake fluid
18 Plunger sequence valves
19 Inlet valves
20 Outlet valves
21 Driver isolation valves
s Position, path
p Pressure
t Time
Q Quality value

The invention claimed is:

1. A device for controlling a braking system of a vehicle, the braking system comprising
a master brake cylinder installation having at least one cylinder and at least one piston, the piston being movably mounted in the cylinder, wherein when activated by a brake pedal, the piston is configured for pressurizing fluid located in the cylinder;
one or more braking installations which are configured for impinging one or more wheels of the vehicle with a braking force; and
a brake assistant installation which is switchable between an activated state and a deactivated state, wherein in the activated state, the brake assistant installation increases the braking force of the braking installations in comparison to the deactivated state; and wherein
the device comprises:
a path sensor installation which is configured for detecting a position of the brake pedal and/or of the piston activated by the brake pedal at a plurality of points in time;
a pressure sensor installation which is configured for detecting a pressure in the fluid situated in the cylinder at a plurality of points in time; and
a control installation which is configured for setting the brake assistant installation to the activated state when a temporal variation of the detected position exceeds a predefined path gradient threshold value, wherein
the path gradient threshold value is predefined as a function of a variation of the detected pressure.

2. The device according to claim 1, wherein the variation of the detected pressure is defined by a temporal offset between the start of a variation of the detected position and the start of an increase of the detected pressure.

3. The device according to claim 2, wherein the path gradient threshold value increases along with the temporal offset.

4. The device according to claim 2, wherein the path gradient threshold value increases along with the temporal offset when the temporal offset exceeds a predefined temporal offset.

5. The device according to claim 1, wherein the variation of the detected pressure is defined by a spatial offset between the position detected at the start of a variation and the position detected at the start of a variation of the detected pressure.

6. The device according to claim 5, wherein the path gradient threshold value increases along with the spatial offset.

7. The device according to claim 5, wherein the path gradient threshold value increases along with the spatial offset when the spatial offset exceeds a predefined spatial offset.

8. The device according to claim 1, wherein the variation of the detected pressure is defined by a gradient of the detected pressure.

9. The device according to claim 8, wherein the path gradient threshold increases as the gradient of the detected pressure decreases.

10. The device according to claim 8, wherein the path gradient threshold value increases as the gradient of the detected pressure decreases when the gradient of the detected pressure undershoots a predefined value.

11. A braking system for a vehicle, having:
a master brake cylinder installation having at least one cylinder and at least one piston which is movably mounted in the cylinder and, when activated by a brake pedal, is configured for pressurizing fluid situated in the cylinder;
one or more braking installations which are configured for impinging one or more wheels of the vehicle with a braking force;
a brake assistant installation which is switchable between an activated state and a deactivated state and, in the activated state, is configured for increasing the braking force where the wheels of the vehicle are impinged by the braking installations in comparison to the deactivated state; and
the device according to claim 1.

12. A motor vehicle having a plurality of wheels and a braking system according to claim 11.

13. A method for controlling a braking system of a vehicle, wherein the braking system has: a master brake cylinder installation having at least one cylinder and at least one piston which is movably mounted in the cylinder and, when activated by a brake pedal, is configured for pressurizing a fluid situated in the cylinder; one or more braking installations which are configured for impinging one or more wheels of the vehicle with a braking force; and a brake assistant installation that is switchable between an activated state and a deactivated state and, in the activated state, is configured for increasing the braking force by way of which the wheels of the vehicle are impinged by the braking installations in comparison to the deactivated state; and wherein the method comprises the following steps:
detecting a position of the brake pedal and/or of the piston activated by the brake pedal at a plurality of points in time;
detecting a pressure of the fluid situated in the cylinder at a plurality of points in time; and
activating the brake assistant installation when a temporal variation of the detected position exceeds a predefined path gradient threshold value and/or when the spacing between two detected positions exceeds a predefined path threshold value, wherein
the path gradient threshold value and/or the path threshold value is predefined as a function of a variation of the detected pressure.

14. A device for controlling a braking system of a vehicle, the braking system comprising
a master brake cylinder installation having at least one cylinder and at least one piston, the piston being movably mounted in the cylinder, wherein when activated by a brake pedal, the piston is configured for pressurizing fluid located in the cylinder;
one more braking installations which are configured for impinging one or more wheels of the vehicle with a braking force; and
a brake assistant installation which is switchable between an activated state and a deactivated state, wherein in the activated state, the brake assistant installation increases the braking force of the braking installations in comparison to the deactivated state; and wherein
the device comprises:
- a path sensor installation which is configured for detecting a position of the brake pedal and/or of the piston activated by the brake pedal at a plurality of points in time;
- a pressure sensor installation which is configured for detecting a pressure in the fluid situated in the cylinder at a plurality of points in time; and
- a control installation which is specified for setting the brake assistant installation to the activated state when the spacing between two detected positions exceeds a predefined path threshold value, wherein the path threshold value is predefined as a function of a variation of the detected pressure.

15. The device according to claim 14, wherein the variation of the detected pressure is defined by a temporal offset between the start of a variation of the detected position and the start of an increase of the detected pressure.

16. The device according to claim 15, wherein the path threshold value increases along with the temporal offset.

17. The device according to claim 15, wherein the path threshold value increases along with the temporal offset when the temporal offset exceeds a predefined temporal offset.

18. The device according to claim 14, wherein the variation of the detected pressure is defined by a spatial offset between the position detected at the start of a variation and the position detected at the start of a variation of the detected pressure.

19. The device according to claim 18, wherein the path threshold value increases along with the spatial offset.

20. The device according to claim 18, wherein the path threshold value increases along with the spatial offset when the spatial offset exceeds a predefined spatial offset.

* * * * *